United States Patent
Tsuji et al.

(10) Patent No.: US 11,884,219 B2
(45) Date of Patent: Jan. 30, 2024

(54) WIRE HARNESS ATTACHMENT STRUCTURE FOR VEHICLE SEAT

(71) Applicants: TOYOTA BOSHOKU KABUSHIKI KAISHA, Aichi-ken (JP); YAZAKI CORPORATION, Tokyo (JP)

(72) Inventors: Keita Tsuji, Aichi-ken (JP); Shingo Kuroiwa, Aichi-ken (JP); Toshiaki Yamashita, Aichi-ken (JP)

(73) Assignees: TOYOTA BOSHOKU KABUSHIKI KAISHA, Aichi-Ken (JP); YAZAKI CORPORATION, Tokyo (JP)

( * ) Notice: Subject to any disclaimer, the term of this patent is extended or adjusted under 35 U.S.C. 154(b) by 289 days.

(21) Appl. No.: 17/209,935

(22) Filed: Mar. 23, 2021

(65) Prior Publication Data

US 2021/0300269 A1  Sep. 30, 2021

(30) Foreign Application Priority Data

Mar. 24, 2020 (JP) ................................ 2020-052253

(51) Int. Cl.
- *B60R 16/02* (2006.01)
- *H02G 11/00* (2006.01)
- *B60N 2/30* (2006.01)

(52) U.S. Cl.
CPC ............ *B60R 16/0215* (2013.01); *B60N 2/30* (2013.01); *H02G 11/00* (2013.01)

(58) Field of Classification Search
CPC ..... B60R 16/0215; B60R 16/027; B60N 2/30; B60N 2/3011; B60N 2/3006; B60N 2/3043; H02G 11/00

(Continued)

(56) References Cited

U.S. PATENT DOCUMENTS

2011/0095585 A1*  4/2011  Kato ................... B60N 2/0232
                                                                   297/344.1
2015/0239369 A1  8/2015  Hoshi
(Continued)

FOREIGN PATENT DOCUMENTS

CN  105793114 A  7/2016
JP  2007-195308 A  8/2007
(Continued)

OTHER PUBLICATIONS

Office Action dated May 17, 2023 in the corresponding Chinese patent application No. CN202110307014.8 (and its English translation).

(Continued)

*Primary Examiner* — Mark R Wendell
(74) *Attorney, Agent, or Firm* — Greenblum & Bernstein, P.L.C.

(57) ABSTRACT

A wire harness attachment structure for a vehicle seat capable of being flipped up from a usage position where the vehicle seat is disposed on a floor to a storage position where the vehicle seat is disposed along a standing wall portion of a vehicle body, includes: a rotation shaft that couples the vehicle seat to the standing wall portion; a guide member including a pair of wall portions arranged to face each other in an axial direction of the rotation shaft, and being partly opened in a radial direction between the wall portions; and a wire harness that electrically couples the vehicle seat and the vehicle body. A portion of the wire harness is disposed between the wall portions and does not come into contact with a member other than the wall portions when the vehicle seat is flipped up from the usage position to the storage position.

7 Claims, 11 Drawing Sheets

(58) Field of Classification Search
USPC .................................................... 297/217.3
See application file for complete search history.

(56) References Cited

U.S. PATENT DOCUMENTS

| | | |
|---|---|---|
| 2016/0288740 A1 | 10/2016 | Katou et al. |
| 2016/0368399 A1 | 12/2016 | Hoshi |
| 2017/0282754 A1 | 10/2017 | Zouzal et al. |
| 2018/0065530 A1 | 3/2018 | Hoshi |
| 2019/0241105 A1 | 8/2019 | Hoshi |
| 2020/0223337 A1 | 7/2020 | Hoshi |
| 2021/0221268 A1 | 7/2021 | Hoshi |
| 2022/0134923 A1 | 5/2022 | Hoshi |

FOREIGN PATENT DOCUMENTS

| | | | |
|---|---|---|---|
| JP | 2007-203757 | * | 8/2007 |
| JP | 2010-006179 A | | 1/2010 |
| JP | 2013-103638 A | | 5/2013 |
| JP | WO2014-033962 A1 | | 6/2014 |
| JP | 2015-151029 A | | 8/2015 |
| JP | 2016-165982 A | | 9/2016 |
| JP | 2016-208799 A | | 12/2016 |
| JP | 2017-024548 A | | 2/2017 |
| JP | 107264344 A | | 10/2017 |
| JP | 2019-112011 A | | 7/2019 |
| WO | WO2012/114551 A1 | | 8/2012 |

OTHER PUBLICATIONS

Office Action dated Aug. 8, 2023 in the corresponding Japanese patent application No. JP2020-052253 (and its English translation).
Office Action in counterpart German patent application No. DE 102021107016.3 dated Oct. 4, 2023 (and its English translation).
Office Action in counterpart Chinese patent application No. CN 202110307014.8 dated Sep. 29, 2023 (and its English translation).

* cited by examiner

WIRE HARNESS ATTACHMENT STRUCTURE FOR VEHICLE SEAT

CROSS-REFERENCE TO RELATED APPLICATIONS

This application claims priority from Japanese Patent Application No. 2020-052253 filed on Mar. 24, 2020, the entire contents of which are incorporated herein by reference.

TECHNICAL FIELD

The present disclosure relates to a wire harness attachment structure for a vehicle seat, and more particularly relates to a wire harness attachment structure for a vehicle seat capable of being flipped up around a rotation shaft that couples the vehicle seat and a vehicle body.

BACKGROUND

The related art JP-A-2016-165982 discloses a vehicle seat capable of being flipped up around a rotation shaft that couples the vehicle seat and a vehicle body. The vehicle seat disclosed in JP-A-2016-165982 can be brought into a storage posture after the vehicle seat is flipped up toward a side portion of the vehicle body around the rotation shaft that couples the side portion of the vehicle body and a seat cushion in a state where a seat back is folded onto the seat cushion. In such a vehicle seat, a wire harness that electrically couples the side portion of the vehicle body and the vehicle seat is inserted into a cylindrical body whose central axis coincides with a central axis of the rotation shaft. When the vehicle seat is flipped up toward the side portion of the vehicle body around the rotation shaft, the wire harness is configured to follow a flip-up operation of the vehicle seat by being deformed in a manner of being twisted in the cylindrical body.

In the technology disclosed in JP-A-2016-165982, the wire harness is twisted in the cylindrical body each time the flip-up operation is performed, and electric wires constituting the wire harness may be worn due to rubbing among the electric wires and may be short-circuited. Since the cylindrical body having a relatively large dimension in a central axis direction must be disposed in a state where the central axis coincides with the central axis of the rotation shaft, a dimension of the rotation shaft in a central axis direction in the vehicle seat may be large.

SUMMARY

In view of the problems described above, an object of the present disclosure is to provide a wire harness attachment structure for a vehicle seat in a compact manner in which the vehicle seat can be flipped up around a rotation shaft that couples the vehicle seat and a vehicle body, and occurrence of wearing, for example, can be prevented.

According to a first aspect of the present disclosure, a wire harness attachment structure for a vehicle seat capable of being flipped up from a usage position where the vehicle seat is disposed on a floor to a storage position where the vehicle seat is disposed along a standing wall portion of a vehicle body, includes: a rotation shaft that couples the vehicle seat to the standing wall portion such that the vehicle seat is rotatable with respect to the standing wall portion; a guide member including a pair of wall portions arranged to face each other in an axial direction of the rotation shaft, the guide member being partly opened in a radial direction between the wall portions; and a wire harness that electrically couples the vehicle seat and the vehicle body, and a portion of the wire harness is disposed between the wall portions and does not come into contact with a member other than the wall portions when the vehicle seat is flipped up from the usage position to the storage position.

According to the first aspect of the present disclosure, since the wire harness is not twisted in an extension direction of a central axis of the wire harness when the wire harness is curved toward a direction perpendicular to the extension direction of the central axis in a process of flipping up the vehicle seat from the usage position to the storage position, wearing due to rubbing among electric wires can be prevented. Since the guide member only needs to be separated in the central axis direction of the rotation shaft as long as the wire harness can be disposed between the wall portions, a length of the guide member in an extension direction of a central axis of the rotation shaft can be shortened and the wire harness attachment structure can be implemented in a compact manner.

According to a second aspect of the present disclosure, in the first aspect of the present disclosure, the wall portions are arranged at positions perpendicularly intersect with a central axis of the rotation shaft.

According to the second aspect of the present disclosure, since the wall portions are surface portions that extend in a radial direction from an axis of the rotation shaft, the wire harness can be curved toward a direction perpendicular to the extension direction of the central axis of the wire harness around the central axis of the rotation shaft. Therefore, an amount of curvature of the wire harness can be reduced and an unnecessary load can be prevented from being applied to the wire harness.

According to a third aspect of the present disclosure, in the second aspect of the present disclosure, each wall portion has a substantially arc shaped-portion whose center is the central axis of the rotation shaft as viewed from the axial direction of the rotation shaft According to the third aspect of the present disclosure, the wire harness can be efficiently prevented from coming into contact with another member when the vehicle seat is flipped up from the usage position to the storage position.

According to a fourth aspect of the present disclosure, in the second aspect or the third aspect of the present disclosure, the wire harness is covered with a protective member on an outer periphery and has a string shape whose cross section has a substantially circular shape, and the portion of the wire harness that is disposed between the wall portions has a smaller diameter than the other portion of the wire harness.

According to the fourth aspect of the present disclosure, since an interval between the wall portions can be reduced, the wire harness attachment structure can be implemented in a more compact manner.

According to a fifth aspect of the present disclosure, in any one of the first aspect to the fourth aspect of the present disclosure, the wall portions included in the guide member have a rib for preventing deformation in an out-of-plane direction According to the fifth aspect of the present disclosure, since the rib prevents the wall portions included in the guide member from being deformed in the out-of-plane direction, the wire harness can be stably held between the wall portions and does not come into contact with another member.

DETAILED DESCRIPTION

Figure 1:
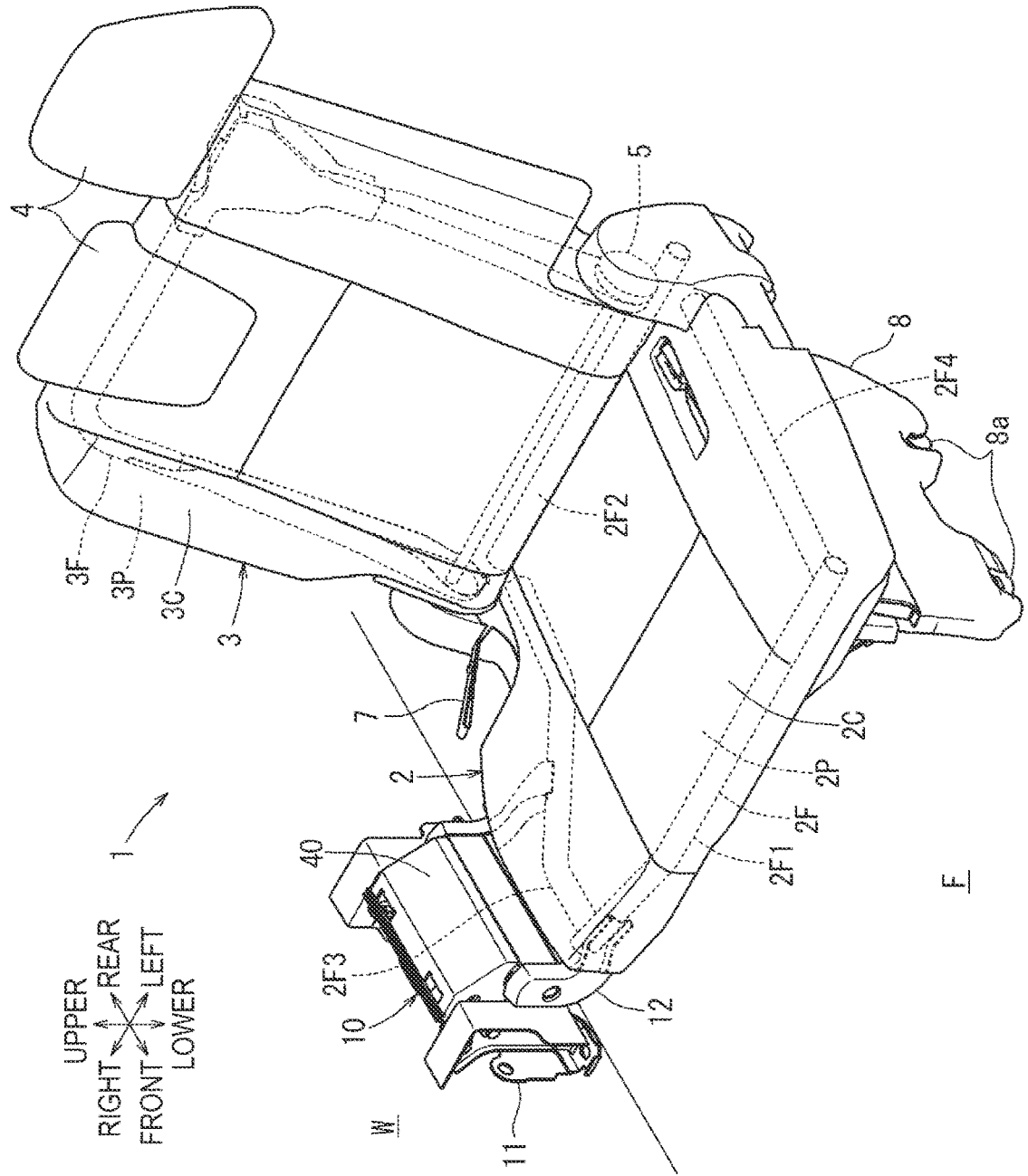
FIG. 1 is a perspective view showing an automobile seat according to an embodiment of the present disclosure in a state where the automobile seat is at a usage position.

FIGS. 1 to 11 show an embodiment of the present disclosure. The embodiment is an example in which the present disclosure is applied to an automobile seat 1. In the drawings, an arrow indicates a direction of an automobile and the automobile seat 1 when the automobile seat 1 is attached to a floor F of the automobile. In the following description, a description regarding a direction is made with reference to the direction. The automobile seat 1 according to the present embodiment is a rear side seat of the automobile. The automobile seat 1 includes a seat cushion 2 serving as a seating portion, a seat back 3 serving as a backrest, and a headrest 4 that supports a head. Lower end portions of both sides of the seat back 3 are coupled to a rear end portion of the seat cushion 2 via a recliner 5. Accordingly, a backrest angle of the seat back 3 relative to the seat cushion 2 can be adjusted, or the seat back 3 can move forward above the seat cushion 2. Here, the automobile seat 1 corresponds to a "vehicle seat" in the claims.

Figure 2:
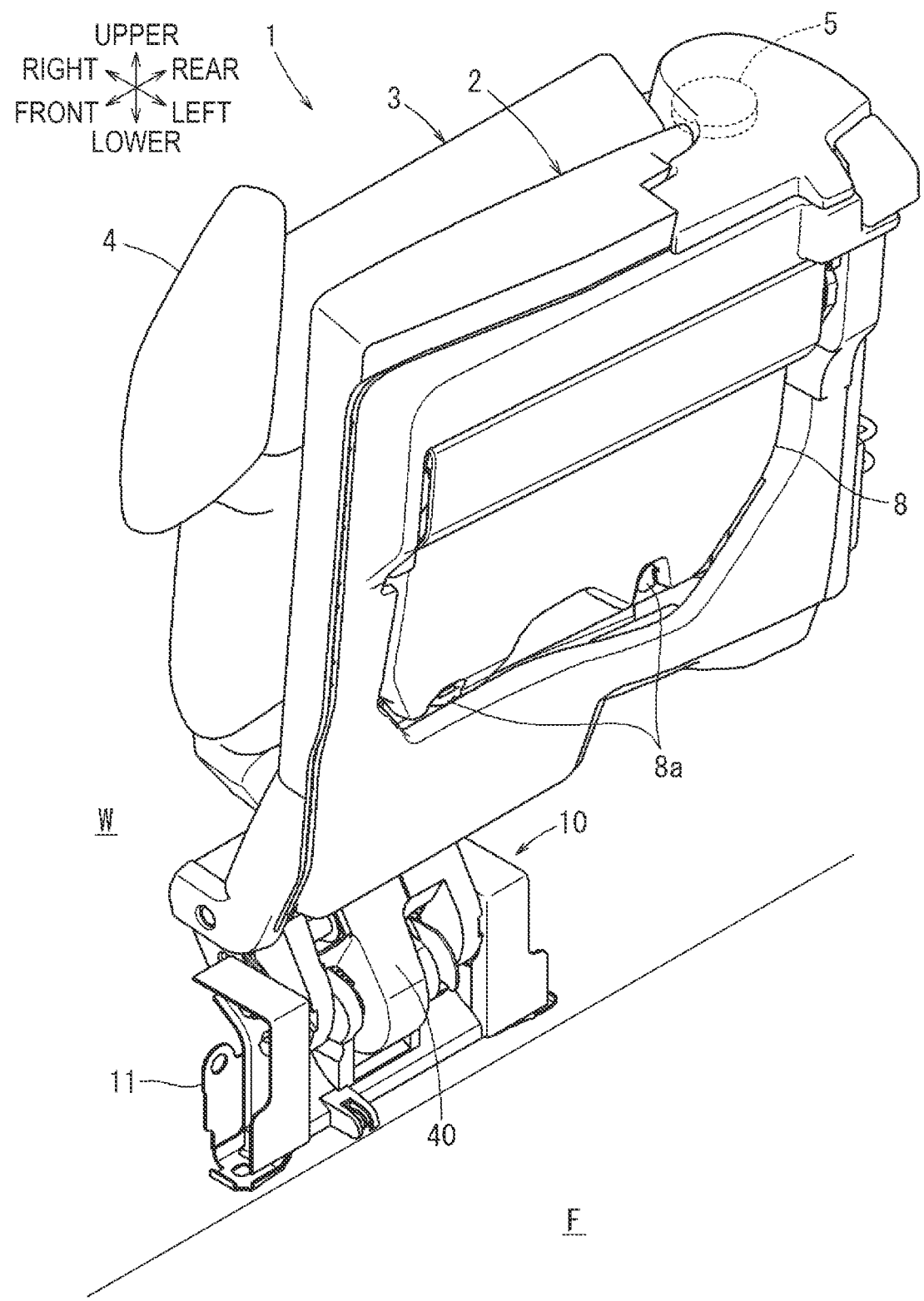
FIG. 2 is a perspective view showing the automobile seat according to the embodiment in a state where the automobile seat is at a storage position.
Figure 3:
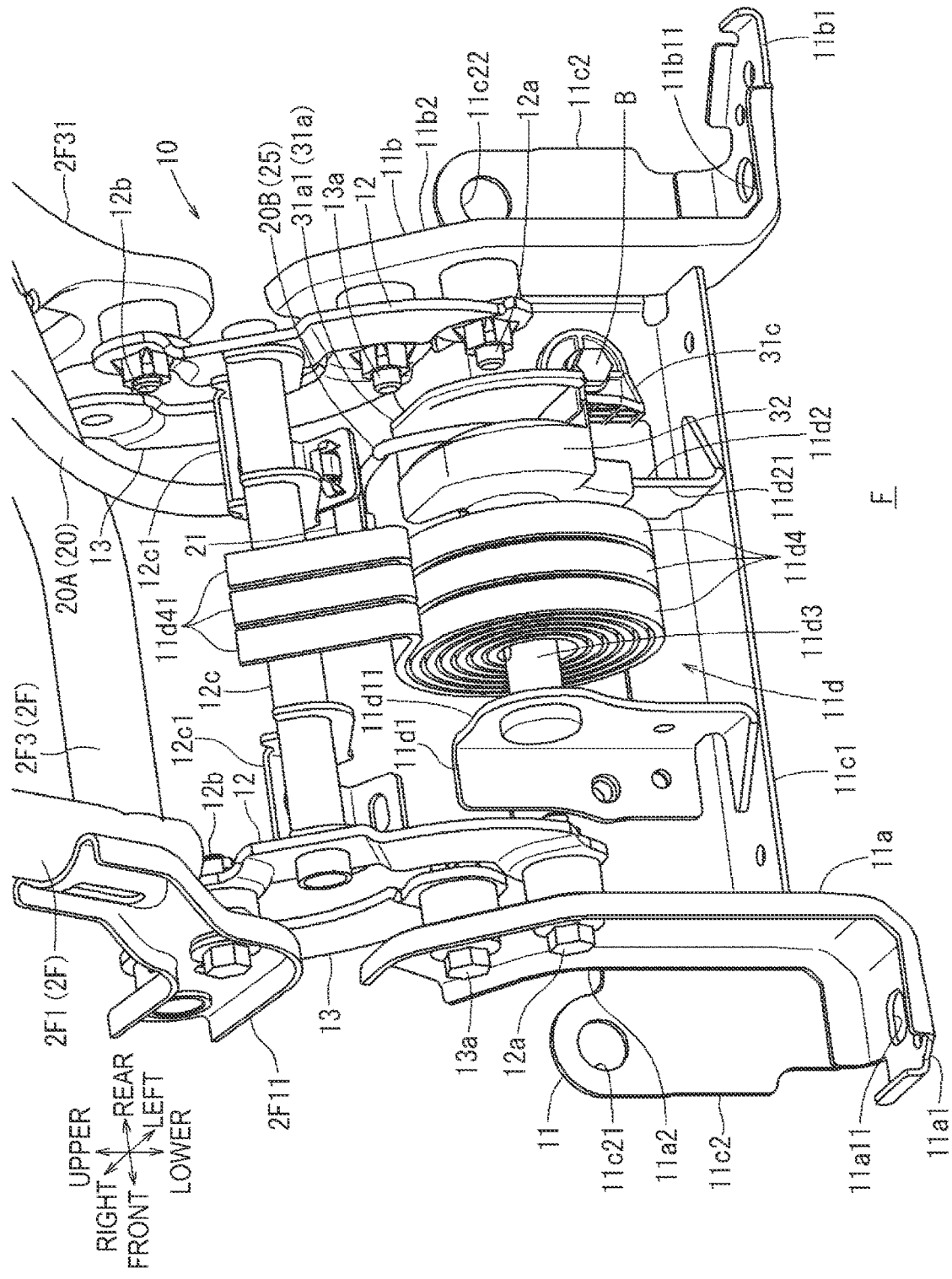
FIG. 3 is a perspective view showing a coupling mechanism according to the embodiment in a state where the automobile seat is at the storage position and a cover is removed.

As shown in FIGS. 1 and 2, the recliner 5 is usually held in a locked state where the backrest angle of the seat back 3 is fixed. The recliner 5 is quickly unlocked from the locked state by performing an operation of pulling forward an operation belt 7 provided at a right rear end side of the seat cushion 2. Accordingly, the seat back 3 is unfixed to the seat cushion 2, and the seat back 3 is rotated forward around an axis of the recliner 5 and is folded onto an upper surface portion of the seat cushion 2. A basic configuration of the recliner 5 is a known configuration disclosed in, for example, JP-A-2002-360368.

As shown in FIGS. 1 and 2, after the seat back 3 is rotated forward and folded onto the upper surface portion of the seat cushion 2, the operation belt 7 is pulled further forward, so that a leg member 8 can be unlocked to strikers (not shown) that are fixed to the floor F, which will be described later. Therefore, the operation belt 7 is further pulled to disengage the automobile seat 1 from the floor F, and the automobile seat 1 is lifted up from the floor F in a folded posture and approaches to a vehicle body side wall portion W. A position of the automobile seat 1 shown in FIG. 1 is a usage position, and a position of the automobile seat 1 shown in FIG. 2 is a storage position. Here, the vehicle body side wall portion W corresponds to a "standing wall portion" in the claims.

As shown in FIGS. 1 and 2, the seat back 3 has a structure in which a back pad 3P that is a cushion material covers a back frame 3F that forms a framework of the seat back 3, and the seat pad 3P is covered from above with a back cover 3C that is a skin material. The back frame 3F is formed into a substantially rectangular frame shape as viewed from a front side by combining pipe members. A plurality of wires (not shown) that support aback surface side of the back pad 3P are arranged in a bridging manner among the pipe members.

Figure 4:
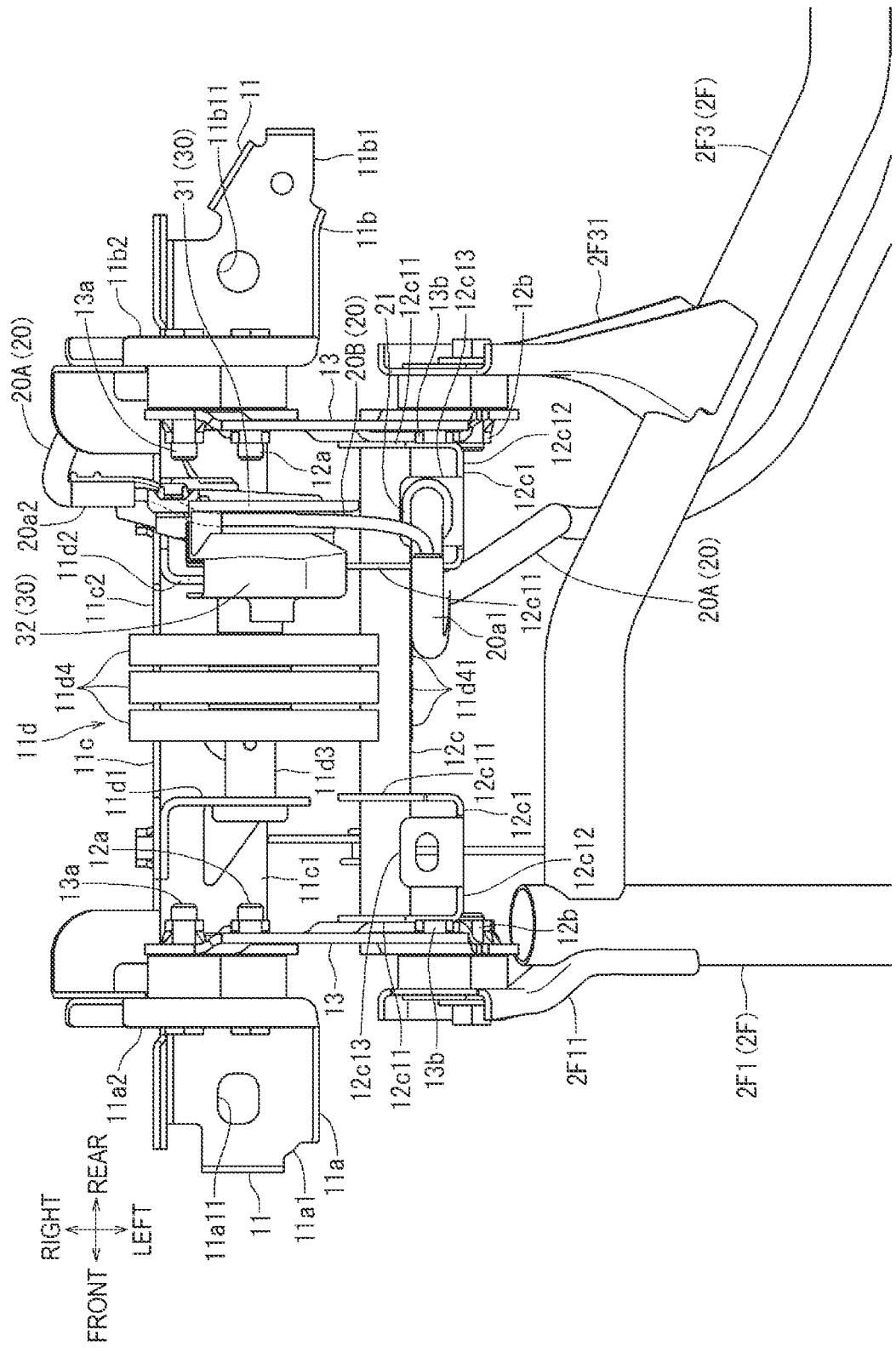
FIG. 4 is a plan view showing the coupling mechanism according to the embodiment in a state where the automobile seat is at the usage position and the cover is removed.
Figure 5:
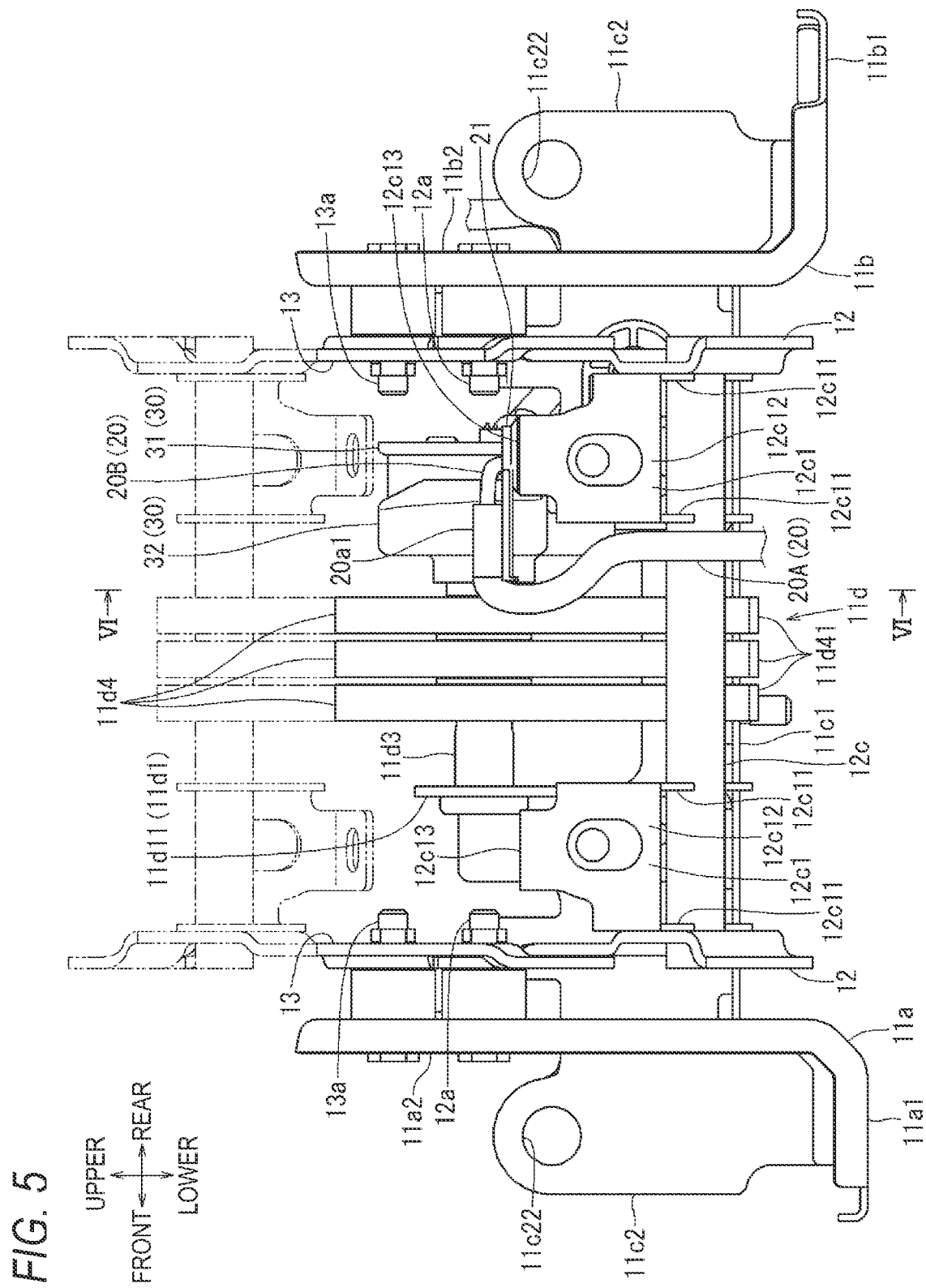
FIG. 5 is a front view showing the coupling mechanism according to the embodiment in a state where the cover is removed, in which solid lines indicate a state where the automobile seat is at the usage position and two-dot chain lines indicate a state where the automobile seat is at the storage position.

The seat cushion 2 has a structure in which a cushion pad 2P that is a cushion material is placed on a cushion frame 2F that forms a framework of the seat cushion 2, and the cushion pad 2P is covered from above with a cushion cover 2C that is a cover material. The cushion frame 2F is formed into a substantially rectangular frame shape as viewed from above by combining pipe members. The cushion frame 2F includes a front portion 2F1, a rear portion 2F2, a right portion 2F3, and a left portion 2F4. A lower arm (not shown) is attached to a rear end portion of the right portion 2F3, and a lower arm (not shown) is attached to a rear end portion of the left portion 2F4. The lower arm at the right side and the lower arm at the left side are coupled to a lower end portion of the back frame 3F via the recliner 5. As shown in FIG. 4, a front bracket 2F11 for coupling with a hinge mechanism 10 is provided at a right end portion side of the front portion 2F1 and extends rightward. A rear bracket 2F31 for coupling with the hinge mechanism 10 is provided at a substantially central portion in a front-rear direction of the right portion 2F3 and extends rightward. A plurality of wires (not shown) that support a back surface side of the cushion pad 22 are attached between the front portion 2F1 and the rear portion 2F2.

A right portion of the cushion frame 2F is attached to the hinge mechanism 10, and the cushion frame 2F is hinged in a manner capable of being rotatably pulled up or lay down with respect to the floor F. The hinge mechanism 10 includes a base member 11 fixed to an automobile body, first link members 12 each having one end rotatably coupled to the base member 11, and second link members 13 each having one end rotatably coupled to the base member 11 above the first link member 12.

As shown in FIGS. 3 to 6, the base member 11 includes a front support member 11a having a substantially L shape as viewed from a right side, a rear support member 11b having a substantially L shape as viewed from a left side, a coupling member 11c that couples the front support member 11a and the rear support member 11b, and a biasing mechanism 11d attached to the coupling member 11c.

The front support member 11a includes a floor fastening portion 11a1 that extends parallel to the floor F, and a link support portion 11*a*2 that extends upward from a rear end portion of the floor fastening portion 11*a*1. A bolt hole 11*a*11 is provided in a substantially central portion of the floor fastening portion 11*a*1. The front support member 11*a* is fastened to the floor F by inserting a bolt (not shown) into the bolt hole 11*a*11, so that the front support member 11*a* can be fixed to the floor F. A third rotation shaft 13*a* which will be described later is supported at an upper end portion side of the link support portion 11*a*2, and a first rotation shaft 12*a* which will be described later is supported below the third rotation shaft 13*a*. In order to enhance strength and rigidity of the front support member 11*a*, a standing wall that extends upward is provided at an outer peripheral edge portion of the floor fastening portion 11*a*1, and a standing wall that extends forward is provided at a front end portion and a rear end portion of the link support portion 11*a*2.

The rear support member 11*b* includes a floor fastening portion 11*b*1 that extends parallel to the floor F, and a link support portion 11*b*2 that extends upward from a front end portion of the floor fastening portion 11*b*1. A bolt hole 11*b*11 is provided in a substantially central portion of the floor fastening portion 11*b*1. The rear support member 11*b* is fastened to the floor F by inserting a bolt (not shown) into the bolt hole 11*b*11, so that the rear support member 11*b* can be fixed to the floor F. The third rotation shaft 13*a* which will be described later is supported at an upper end portion side of the link support portion 11*b*2, and the first rotation shaft 12*a* which will be described later is supported below the third rotation shaft 13*a*. In order to enhance strength and rigidity of the rear support member 11*b*, a standing wall that extends upward is provided at an outer peripheral edge portion of the floor fastening portion 11*b*1, and a standing wall that extends rearward is provided at a front end portion and a rear end portion of the link support portion 11*a*2. The third rotation shaft 13*a* and the first rotation shaft 12*a* of the front support member 11*a* are coaxial with the third rotation shaft 13*a* and the first rotation shaft 12*a* of the rear support member 11*b*, respectively.

The coupling member 11*c* includes a horizontal wall portion 11*c*1 that extends in a front-rear direction and parallel to the floor F, and a vertical wall portion 11*c*2 that extends in a vertical direction from a right end portion of the horizontal wall portion 1*c*1. A front end portion of the horizontal wall portion 11*c*1 is coupled to a rear surface side of the link support portion 11*a*2 of the front support member 11*a*, and a rear end portion of the horizontal wall portion 11*c*1 is coupled to a front surface side of the link support portion 11*b*2 of the rear support member 11*b*. A front end portion side of the vertical wall portions 11*c*2 is coupled to a right side of the floor fastening portion 11*a*1 of the front support member 11*a* and a right side of the link support portion 11*a*2. The coupling member 11*c* is fastened to the vehicle body side wall portion W by inserting a bolt (not shown) into a bolt hole 11*c*21, so that the coupling member 11*c* can be fixed to the vehicle body side wall portion W. A rear end portion side of the vertical wall portion 11*c*2 is coupled to a right side of the floor fastening portion 11*b*1 of the rear support member 11*b* and a right side of the link support portion 11*b*2. The coupling member 11*c* is fastened to the vehicle body side wall portion W by inserting a bolt (not shown) into a bolt hole 11*c*22, so that the coupling member 11*c* can be fixed to the vehicle body side wall portion W. Since the front support member 11*a* and the rear support member 11*b* are fixed to the floor F and the coupling member 11*c* is fixed to the vehicle body side wall portion W, the base member 11 is firmly fixed to the vehicle body.

The biasing mechanism 11*d* has a function of biasing in a direction of lifting up the automobile seat 1 so as to bring the automobile seat 1 close to the vehicle body side wall portion W. The biasing mechanism 11*d* is disposed between an upper side surface of the horizontal wall portion 11*c*1 and a left side surface of the vertical wall portion 11*c*2. The biasing mechanism 11*d* includes a front plate member 11*d*1 having a front plate portion 11*d*11 perpendicular to the horizontal wall portion 11*c*1 and the vertical wall portion 11*c*2, and a rear plate member 11*d*2 having a rear plate portion 11*d*21 perpendicular to the horizontal wall portion 11*c*1 and the vertical wall portion 11*c*2. The biasing mechanism 11*d* further includes a spring shaft 11*d*3 that extends in the front-rear direction and that is coupled between the front plate member 11*d*1 and the rear plate member 11*d*2 in a bridging manner, and three spiral springs 11*d*4 each having an inner end portion coupled to the spring shaft 1*d*3. The spring shaft 11*d*3 is coaxial with the first rotation shaft 12*a* which will be described later. A right surface of an outer end portion 11*d*41 of the respective spiral spring 11*d*4 is in contact with a pipe member 12*c* which will be described later in a state where the automobile seat 1 is at the storage position.

Figure 6:
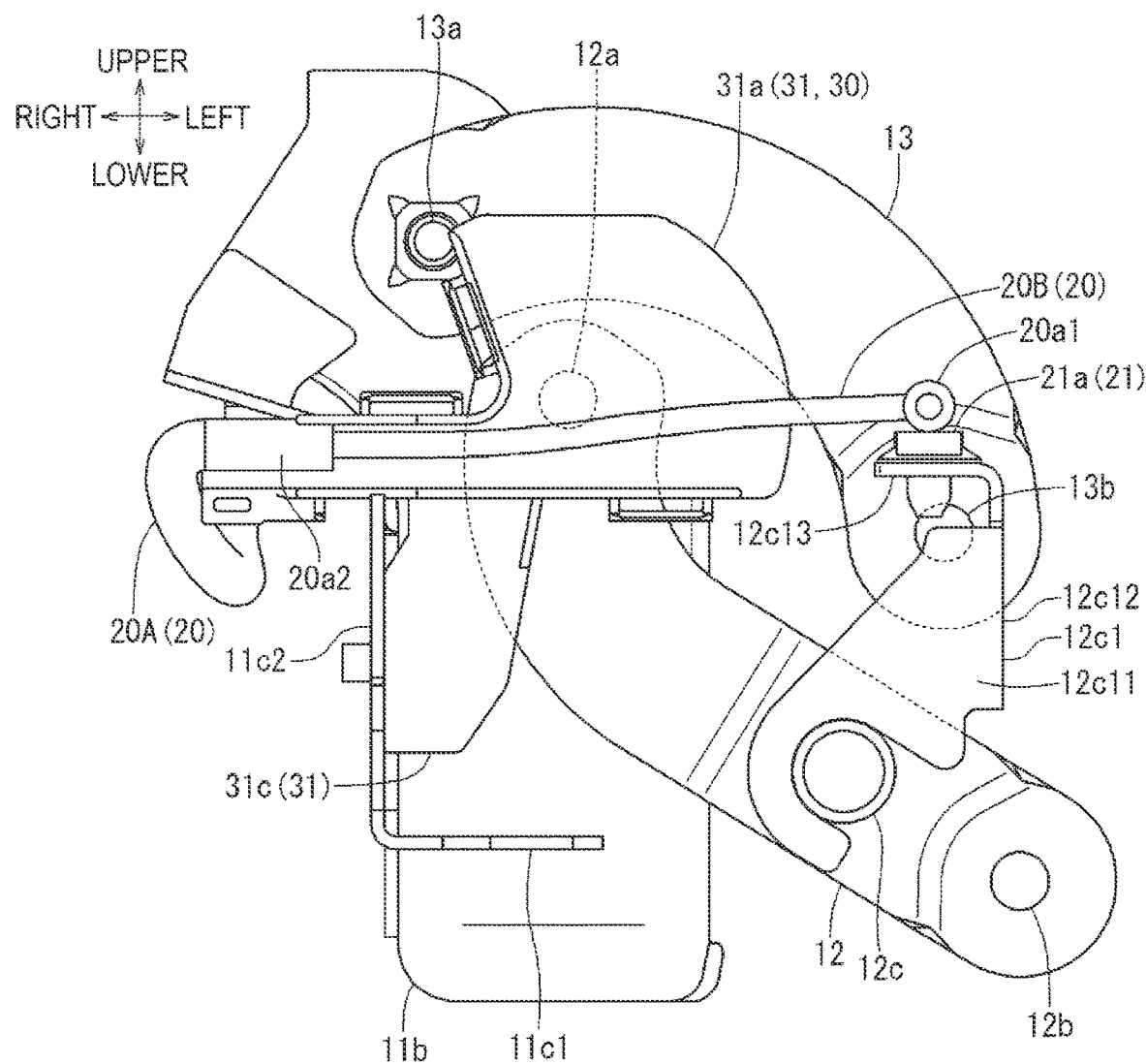
FIG. 6 is a cross-sectional view taken along a line VI-VI in FIG. 5 and showing a state where the automobile seat is at the usage position.

As shown in FIG. 6, the first link member 12 is a plate-shaped member. One end of the first link member 12 is rotatably coupled to the base member 11 around the first rotation shaft 12*a* that extends in the front-rear direction. The first link member 12 extends from the one end to the other end such that the first link member 12 has a curved shape in a counterclockwise direction around the first rotation shaft 12*a* in FIG. 6. The other end of the first link member 12 at a front side is rotatably coupled to the front bracket 2F11 around a second rotation shaft 12*b* that extends in the front-rear direction, and the other end of the first link member 12 at a rear side is rotatably coupled to the rear bracket 2F31 around the second rotation shaft 12*b*. The first link member 12 at the front side and the first link member 12 at the rear side are coupled by the cylindrical pipe member 12*c* that extends in the front-rear direction between one end and the other end of the pipe member 12*c*. Therefore, the first link member 12 at the front side and the first link member 12 at the rear side rotate integrally with respect to the base member 11 around the first rotation shaft 12*a*. As shown in FIG. 6, the second link member 13 is a plate-shaped member. One end of the second link member 13 is rotatably coupled to the base member 11 around the third rotation shaft 13*a* that extends in the front-rear direction. The second link member 13 extends from the one end to the other end such that the second link member 13 has a curved shape in a clockwise direction around the third rotation shaft 13*a* in FIG. 6. The other end of the second link member 13 at a front side is rotatably coupled to the front bracket 2F11 around a fourth rotation shaft 13*b* that extends in the front-rear direction, and the other end of the second link member 13 at a rear side is rotatably coupled to the rear bracket 2F31 around the fourth rotation shaft 13*b*. The respective second rotation shaft 12*b* of the front bracket 2F11 and the rear bracket 2F31 is located below the respective fourth rotation shaft 13*b* of the front bracket 2F11 and the rear bracket 2F31 in a state where the automobile seat 1 is at the usage position. The front support member 11*a*, the first link member 12 at the front side, the second link member 13 at the front side, and the front bracket 2F11 form a four-bar link. The rear support member 11*b*, the first link member 12 at the rear side, the second link member 13 at the rear side, and the rear bracket 2F31 form a four-bar link. Here, the first rotation shaft 12a corresponds to a "rotation shaft" in the claims.

As shown in FIGS. 3 to 6, harness fixing brackets 12c1 are respectively attached to left and right end portions of the pipe member 12c. Each of the harness fixing brackets 12c1 includes a pair of standing plate portions 12c11 that extend in a radial direction of the pipe member 12c and a horizontal plate portion 12c12 that couples end portions of the standing plate portions 12c11 opposite to the pipe member 12c. The horizontal plate portion 12c12 is perpendicular to the floor F in a state where the automobile seat 1 is at the usage position. A harness fixing portion 12c13 bent in a direction of the pipe member 12c perpendicularly to the horizontal plate portion 12c12 is provided on an upper portion of the horizontal plate portion 12c12. A through hole passing through the harness fixing portion 12c13 in a vertical direction is provided in the harness fixing portion 12c13. A portion of a harness 20 is fixed to the harness fixing bracket 12c1 by inserting a clip 21 attached to the harness 20 into the through hole. Here, the harness 20 corresponds to a "wire harness" in the claims.

Figure 9:
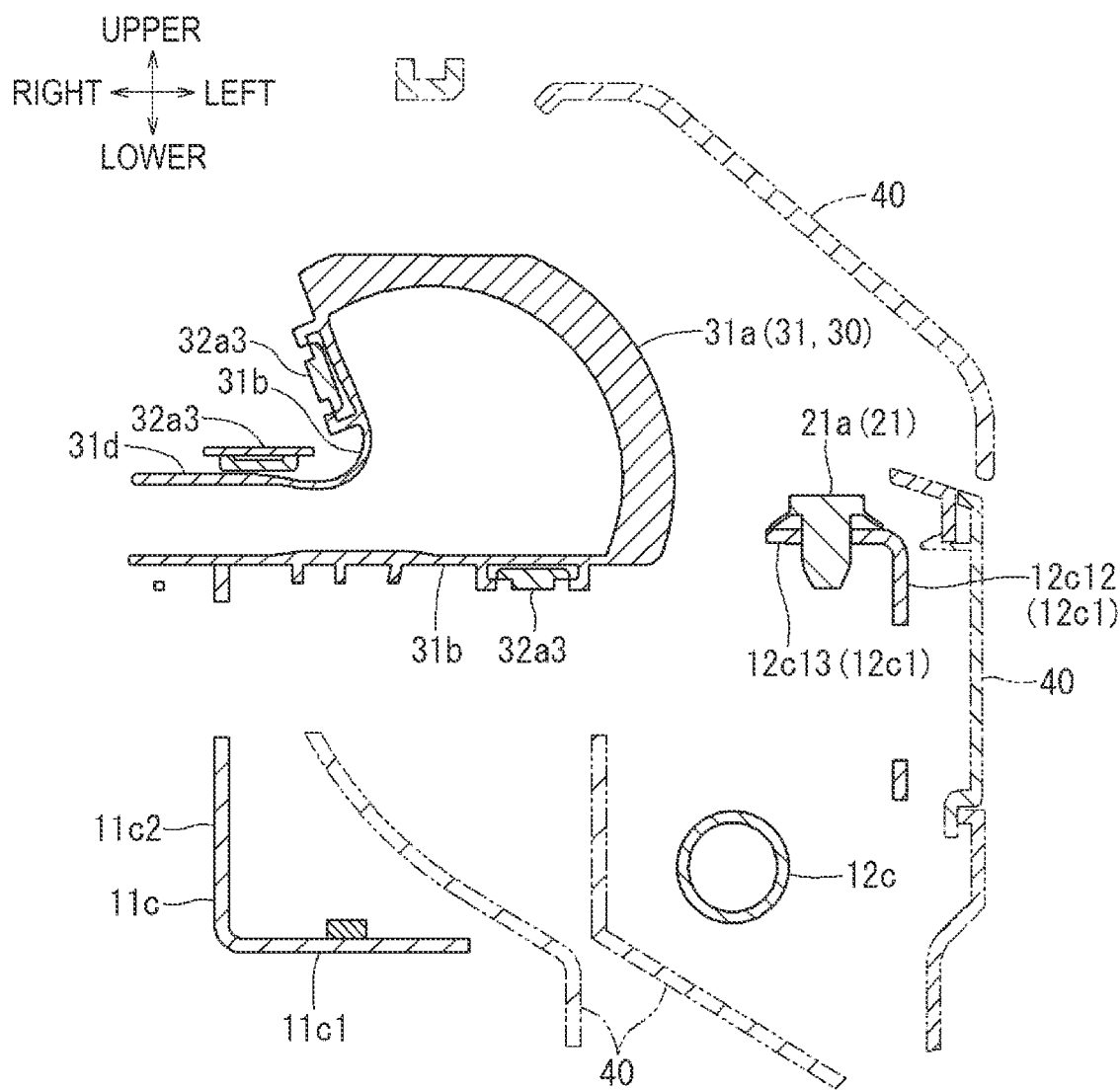
FIG. 9 is a cross-sectional view taken along a line IX-IX in FIG. 8.
Figure 11:
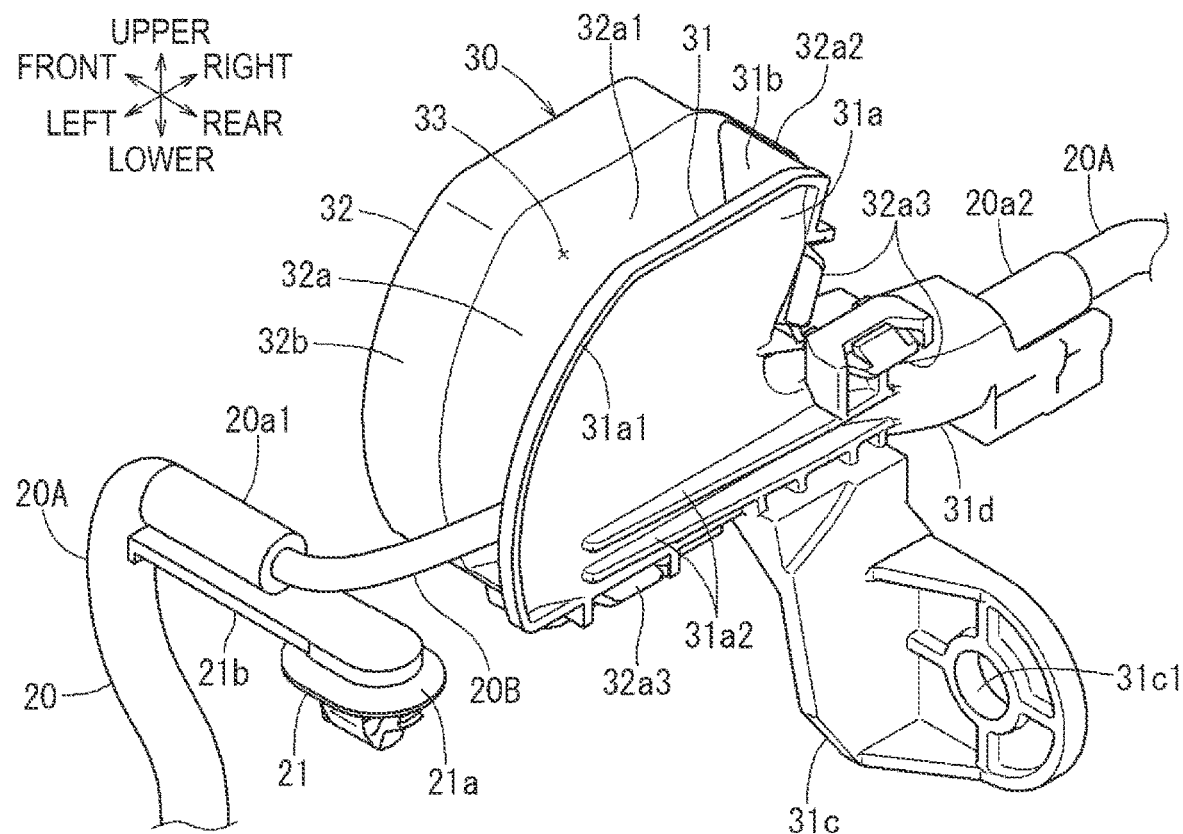
FIG. 11 is a perspective view showing a guide member according to the embodiment.

As clearly shown in FIGS. 9 and 11, the clip 21 includes a base portion 21a coupled to the through hole of the harness fixing portion 12c13 included in the harness fixing bracket 12c1 by a snap-fit method, and an extension portion 21b that extends horizontally in a direction away from the base portion 21a. A pipe-shaped left locking portion 20a1 through which the harness 20 passes is provided on an intermediate portion of the harness 20. The clip 21 is coupled to the harness 20 by attaching the left locking portion 20a1 to the extension portion 21b. In this state, the harness 20 is fixed to the harness fixing bracket 12c1 by attaching the clip 21 to the harness fixing portion 12c13. In a state where the harness 20 is fixed to the harness fixing bracket 12c1, a portion of the harness 20 that extends from the left locking portion 20a1 toward the seat cushion 2 is formed as a large diameter portion 20A on which a protective member is wound thick. In the state where the harness 20 is fixed to the harness fixing bracket 12c1, a portion of the harness 20 that extends from the left locking portion 20a1 toward a guide member 30 which will be described later is formed as a small diameter portion 20B on which a protective member is wound thin.

Figure 10:
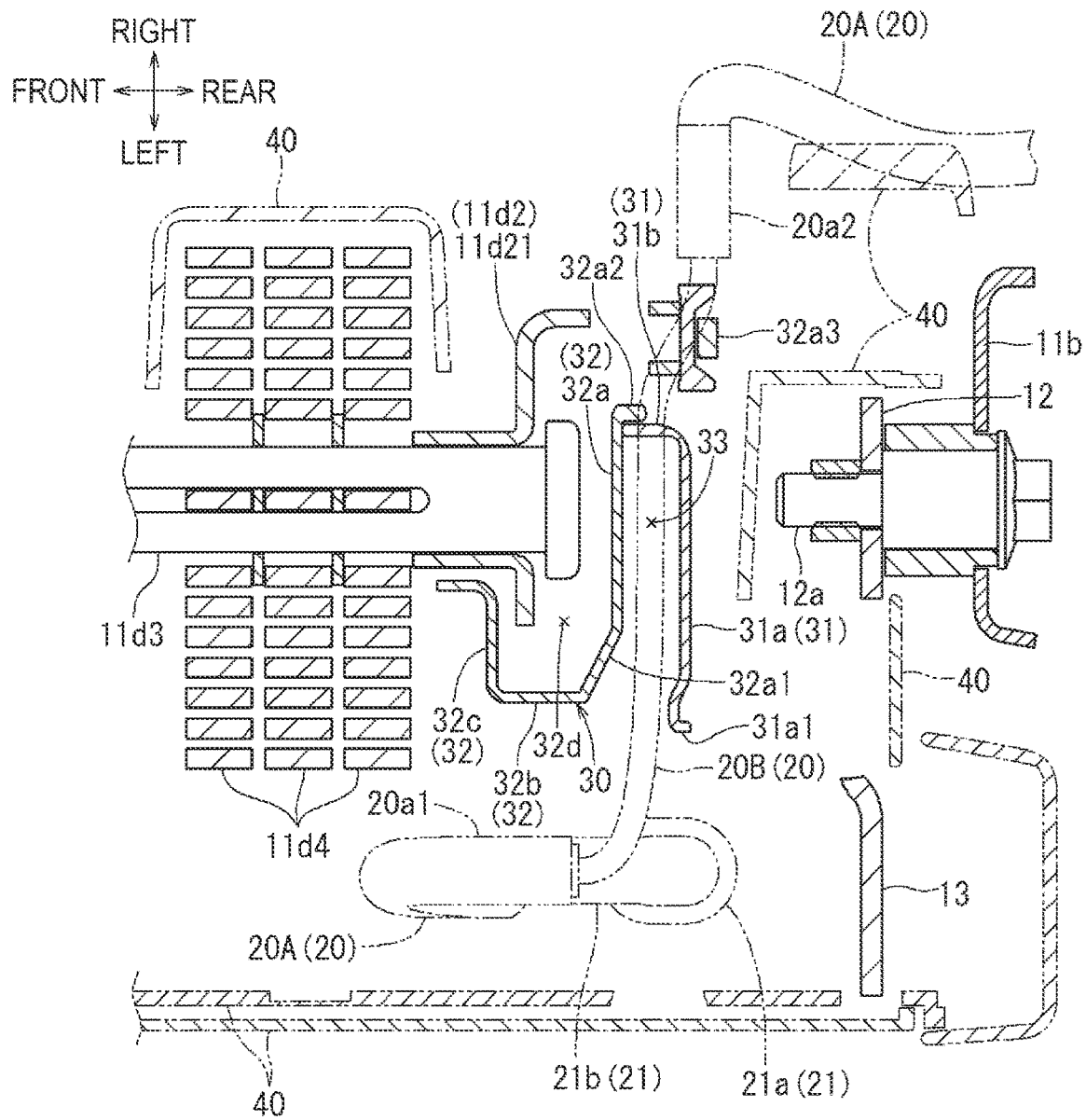
FIG. 10 is a cross-sectional view taken along a line X-X in FIG. 9.

As clearly shown in FIGS. 9 to 11, the guide member 30 includes a first wall portion 31 fixed to the vertical wall portion 11c2 of the base member 11, and a second wall portion 32 attached to the first wall portion 31 to form a gap 33 between the first wall portion 31 and the second wall portion 32. The first wall portion 31 includes a rear wall surface portion 31a having a substantially fan shape in a side view and perpendicular to the floor F, a standing wall portion 31b that extends forward from a lower end portion and a right end portion of the rear wall surface portion 31a, a fixing portion 31c that extends downward from the lower end portion of the rear wall surface portion 31a, and a harness support portion 31d that extends rightward from a rear end portion of the rear wall surface portion 31a. An outer peripheral rib 31a1 that extends rearward is provided on an upper end portion and a left end portion of the rear wall surface portion 31a. Two lower ribs 31a2 that are coupled to the harness support portion 31d at right end portions and that extend parallel to each other in a left-right direction are provided on a lower portion of the rear wall surface portion 31a on a rear surface side. The outer peripheral rib 31a1 and the lower ribs 31a2 contribute to enhancement of surface rigidity of the rear wall surface portion 31a.

The fixing portion 31c has a bolt hole 31c1 passing through the fixing portion 31c in the left-right direction. The first wall portion 31 is fastened to the vertical wall portion 11c2 of the base member 11 by inserting a bolt B (see FIG. 3) into the bolt hole 31c1, so that the first wall portion 31 can be fixed to the base member 11. The harness support portion 31d has a substantially U shape that opens forward in a cross section as viewed from a left side. A left end portion of the harness support portion 31d is coupled to the rear wall surface portion 31a and the standing wall portion 31b. A pipe-shaped right locking portion 20a2 through which the harness 20 passes is attached to a portion of the harness 20 at a right side relative to the left locking portion 20a1. The right locking portion 20a2 is disposed in the harness support portion 31d having a substantially U shape in a cross section, so that the harness 20 is fixed to the harness support portion 31d. In this case, a portion of the harness 20 between the left locking portion 20a1 and the right locking portion 20a2 has the small diameter portion 20B, and a portion of the harness 20 that extends from the right locking portion 20a2 to the vehicle body side wall portion W has the large diameter portion 20A. Here, the hinge mechanism 10, the harness 20, and the guide member 30 correspond to a "wire harness attachment structure" in the claims. The rear wall surface portion 31a corresponds to a "wall portion" in the claims. The outer peripheral rib 31a1 and the lower ribs 31a2 correspond to a "rib" in the claims.

As clearly shown in FIGS. 9 to 11, the second wall portion 32 includes a front wall surface portion 32a substantially perpendicular to the floor F and substantially overlapping the rear wall surface portion 31a in a side view, a standing wall portion 32b that extends forward from an upper end portion and a left end portion of the front wall surface portion 32a, and a folded portion 32c that extends from a left end portion of the standing wall portion 32b and that faces the front wall surface portion 32a. An upper end portion side and a left end portion side of the front wall surface portion 32a has an inclined surface portion 32a1, so that an interval between the front wall surface portion 32a and the rear wall surface portion 31a gradually increases toward end portions of the front wall surface portion 32a. An outer peripheral rib 32a2 that extends rearward is provided on a lower end portion and a right end portion of the front wall surface portion 32a. Snap-fit portions 32a3 that extend rearward are provided on the lower end portion and the right end portion of the front wall surface portion 32a at three positions. The second wall portion 32 is integrated with the first wall portion 31 by snap-fitting the three snap-fit portions 32a3 to respectively corresponding positions of the first wall portion 31. In this case, the gap 33 is formed between the rear wall surface portion 31a included in the first wall portion 31 and the front wall surface portion 32a included in the second wall portion 32 that face each other. The small diameter portion 20B of the harness 20 is disposed in the gap 33. A part of the rear plate portion 11d21 of the biasing mechanism 11d is disposed in a space portion 32d that is surrounded by the front wall surface portion 32a, the standing wall portion 32b, and the folded portion 32c. When the guide member 30 is attached to the base member 11, a central axis of the first rotation shaft 12a passes through a vicinity of a portion corresponding to a pivot of a fan shape of the rear wall surface portion 31a included in the first wall portion 31 in a side view, and a vicinity of a portion corresponding to a fan shape of the front wall surface portion 32a included in the second wall portion 32 in a side view. Here, the front wall surface portion 32a corresponds to a "wall portion" in the claims. The outer peripheral rib 32a2 corresponds to a "rib" in the claims.

Figure 8:
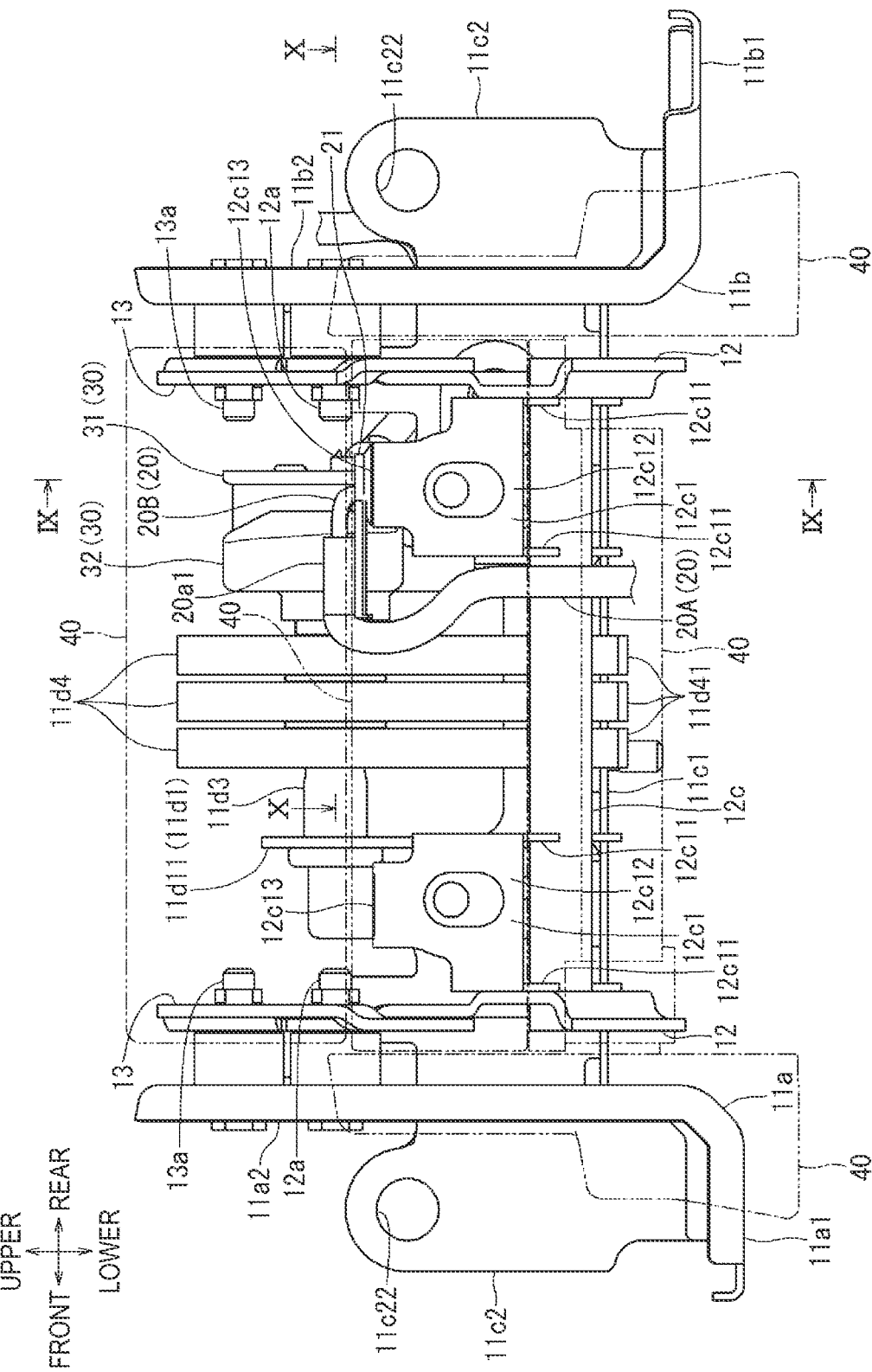
FIG. 8 is a front view showing the coupling mechanism according to the embodiment in a state where the cover is attached and the automobile seat is at the usage position (two-dot chain lines indicate the cover).

As shown in FIGS. 8 to 10, the guide member 30 and the harness 20 are attached to the base member 11 in a state where the cushion frame 2F is attached to the base member 11 via the first link members 12 and the second link members 13. In this state, a cover 40 formed of resin is attached to improve an external appearance.

A left side portion of the cushion frame 2F is supported from below by the leg member 8 erected toward the floor F. The leg member 8 has a substantially rectangular shape that extends in the front-rear direction in a side view. An upper end portion of the leg member 8 is coupled to a left side portion of the cushion frame 2F by a coaxial coupling shaft (not shown), so that the leg member 8 is rotatable in the vertical direction. Therefore, the leg member 8 can be rotated to fold or unfold between an unfolded state where the leg member 8 has a posture of erecting below a bottom surface portion of the seat cushion 2 in the usage position of the automobile seat 1 shown in FIG. 1 and a folded state where the leg member 8 is folded to the bottom surface portion of the seat cushion 2 in the storage position of the automobile seat 1 shown in FIG. 2. A biasing mechanism (not shown) that rotatably biases the leg member 8 to the unfolded state around the coupling shaft is provided between the cushion frame 2F and the leg member 8.

Lock mechanisms 8a that can be locked or unlocked to strikers (not shown) arranged side by side in the front-rear direction on the floor F are provided at a lower end portion of the leg member 8. Two lock mechanisms 8a come into contact with the strikers by a movement of dropping the automobile seat 1 onto the floor F in the unfolded state of the leg member 8, and then the lock mechanisms 8a are further pushed in a direction of hooking the strikers, so that the lock mechanisms 8a are locked. A hooking state (engagement lock state) of the lock mechanisms 8a and the strikers can be released by an operation of pulling forward the operation belt 7 (see FIG. 1). Accordingly, the automobile seat 1 is lifted up from the floor F by a biasing force of the biasing mechanism 11d provided in the hinge mechanism 10, so that the automobile seat 1 is brought into a standing posture. At this time, the leg member 8 may be manually folded and brought into a folded state against the biasing force of the biasing mechanism, or may be automatically folded along with a movement of rotating the automobile seat 1 to a standing position as disclosed in JP-A-2016-074308, for example.

Figure 7:
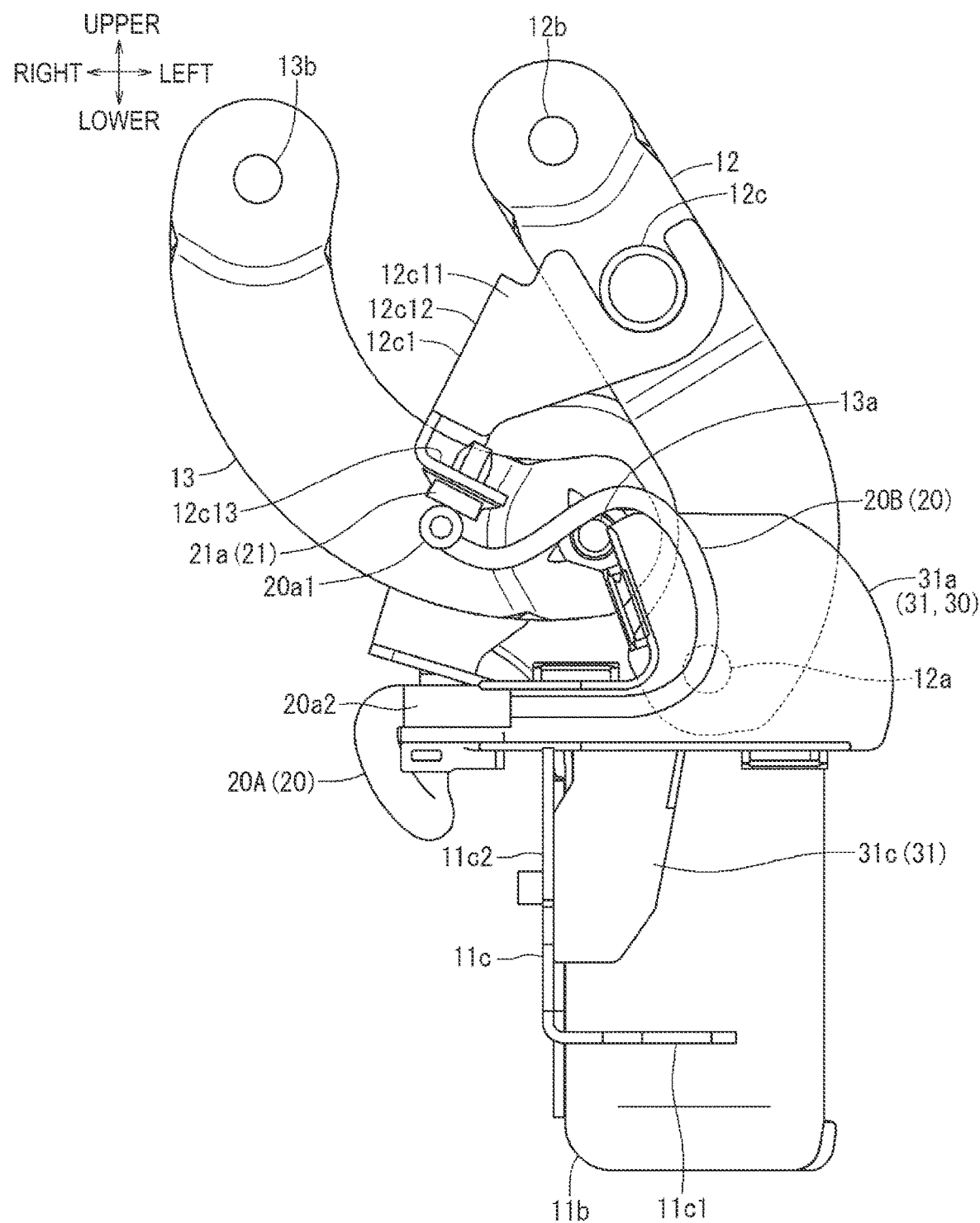
FIG. 7 shows a state where the automobile seat in FIG. 6 is at the storage position.

The present embodiment having the above configurations has the following effects. As shown in FIGS. 6 and 11, at the usage position of the automobile seat 1, a left end portion of the small diameter portion 20B of the harness 20 is fixed to the harness fixing bracket 12c1 at the rear side, and a right end portion of the small diameter portion 20B of the harness 20 is fixed to the harness support portion 31d of the guide member 30, and thus, the small diameter portion 20B of the harness 20 is disposed in the gap 33. As shown in FIG. 7, at the storage position of the automobile seat 1, the small diameter portion 20B of the harness 20 is curved toward a direction perpendicular to an extension direction of a central axis of the small diameter portion 20B of the harness 20 in the gap 33, and is held by the rear wall surface portion 31a and the front wall surface portion 32a so that the small diameter portion 20B of the harness 20 does not come into contact with another member. In a process of changing from the usage position of the automobile seat 1 in FIG. 6 to the storage position of the automobile seat 1 in FIG. 7, the small diameter portion 20B of the harness 20 is held by the rear wall surface portion 31a and the front wall surface portion 32a, so that the small diameter portion 20B of the harness 20 does not come into contact with another member while a degree of curvature of the small diameter portion 20B of the harness 20 in the gap 33 gradually increases. In this manner, since the harness 20 is not twisted around the extension direction of the central axis of the harness 20, wearing due to rubbing among electric wires can be prevented. The interval between the rear wall surface portion 31a and the front wall surface portion 32a in the front-rear direction only needs to be separated in a radial direction of the small diameter portion 20B of the harness 20 as long as the small diameter portion 20B can be disposed in the interval, so that a length of the guide member 30 in an extension direction of the central axis of the first rotation shaft 12a can be shortened. Accordingly, the hinge mechanism 10 can be implemented in a compact manner.

The rear wall surface portion 31a and the front wall surface portion 32a of the guide member 30 are disposed at positions where the central axis of the first rotation shaft 12a passes through, and are formed as surface portions that extend in a radial direction from the central axis of the first rotation shaft 12a. Accordingly, since the small diameter portion 20B of the harness 20 can be curved toward the direction perpendicular to the extension direction of the central axis of the small diameter portion 20B around the axis of the first rotation shaft 12a, an amount of curvature of the small diameter portion 20B can be reduced and an unnecessary load can be prevented from being applied to the small diameter portion 20B. In most of an angle range in which the left locking portion 20a1 rotates around the first rotation shaft 12a, each of the rear wall surface portion 31a and the front wall surface portion 32a has a substantially arc shaped-portion whose center is the central axis of the first rotation shaft 12a as viewed from the front-rear direction. Accordingly, the harness 20 can be efficiently prevented from coming into contact with another member when the automobile seat 1 is flipped up from the usage position to the storage position.

The small diameter portion 20B of the harness 20 that is disposed in the gap 33 between the rear wall surface portion 31a and the front wall surface portion 32a has a diameter smaller than the large diameter portion 20A which is the other portion of the harness 20. Therefore, the hinge mechanism 10 can be made in a more compact manner since the interval between the rear wall surface portion 31a and the front wall surface portion 32a can be reduced. In addition, since the rear wall surface portion 31a has the outer peripheral rib 31a1 and the lower ribs 31a2, the rear wall surface portion 31a can be prevented from deformation in an out-of-plane direction, so that the harness 20 can be stably held between the rear wall surface portion 31a and the front wall surface portion 32a and does not come into contact with another member. Since the front wall surface portion 32a has the outer peripheral rib 32a2, the front wall surface portion 32a is also prevented from deformation in an out-of-plane direction.

Although specific embodiments have been described above, the present disclosure is not limited to external appearances and configurations in the embodiments, and various modifications, additions, and deletions may be made without changing the spirit of the present disclosure. Examples of the embodiments include the following matters.

1. In the embodiment described above, the base member 11 and the cushion frame 2F are coupled by the first link members 12 and the second link members 13 to form a four-bar link mechanism. However, the present disclosure is not limited thereto. The first link members 12 may be fixed to the cushion frame 2F and the first link members 12 and the cushion frame 2F may be integrated with each other and rotate around the first rotation shaft 12*a*.

2. In the embodiment described above, the automobile seat 1 is flipped up toward the vehicle body side wall portion in a state where the seat back 3 is folded onto an upper surface portion of the seat cushion 2. However, the present disclosure is not limited thereto. The automobile seat 1 may be flipped up as it is, or may be rotated forward or rearward.

3. Although the present disclosure is applied to an automobile seat in the embodiment described above, the present disclosure may be applied to a seat mounted on an airplane, a ship, a train, or the like.

What is claimed is:

1. A wire harness attachment structure for a vehicle seat, the vehicle seat being capable of being flipped up from a usage position where the vehicle seat is disposed on a floor to a storage position where the vehicle seat is disposed along a standing wall portion of a vehicle body, the wire harness attachment structure comprising:
    a rotation shaft that couples the vehicle seat to the standing wall portion such that the vehicle seat is rotatable with respect to the standing wall portion;
    a guide member including a pair of wall portions arranged to face each other in an axial direction of the rotation shaft, the guide member being partly opened in a radial direction between the wall portions; and
    a wire harness that electrically couples the vehicle seat and the vehicle body,
    wherein a portion of the wire harness is disposed between the wall portions and does not come into contact with a member other than the wall portions when the vehicle seat is flipped up from the usage position to the storage position.

2. The wire harness attachment structure for the vehicle seat according to claim 1,
    wherein the wall portions are arranged at positions that perpendicularly intersect with a central axis of the rotation shaft.

3. The wire harness attachment structure for the vehicle seat according to claim 2,
    wherein each wall portion has a substantially arc shaped-portion whose center is the central axis of the rotation shaft as viewed from the axial direction of the rotation shaft.

4. The wire harness attachment structure for the vehicle seat according to claim 2,
    wherein the wire harness is covered with a protective member on an outer periphery and has a string shape whose cross section has a substantially circular shape, and
    wherein the portion of the wire harness that is disposed between the wall portions has a smaller diameter than the other portion of the wire harness.

5. The wire harness attachment structure for the vehicle seat according to claim 1,
    wherein the wall portions included in the guide member have a rib for preventing deformation in an out-of-plane direction.

6. The wire harness attachment structure for the vehicle seat according to claim 1, wherein the guide member is a wire harness guide member.

7. The wire harness attachment structure for the vehicle seat according to claim 1, wherein the portion of the wire harness is disposed in the guide member when the vehicle seat is flipped up from the usage position to the storage position.

* * * * *